US006895531B2

(12) United States Patent
Suzuki et al.

(10) Patent No.: US 6,895,531 B2
(45) Date of Patent: May 17, 2005

(54) METHOD AND SYSTEM FOR ROUTING PACKETS WITHOUT LOSING PACKETS BY MONITORING OUTGOING LINES

(75) Inventors: Yuichi Suzuki, Tokyo (JP); Keisuke Fukumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 610 days.

(21) Appl. No.: 09/885,134

(22) Filed: Jun. 21, 2001

(65) Prior Publication Data

US 2001/0056553 A1 Dec. 27, 2001

(30) Foreign Application Priority Data

Jun. 21, 2000 (JP) ........................................ 2000-186834

(51) Int. Cl.[7] .............................................. G06F 11/00
(52) U.S. Cl. ........................................ 714/43; 370/218
(58) Field of Search ...................... 714/43, 4; 709/224; 370/217, 218, 225

(56) References Cited

U.S. PATENT DOCUMENTS

| 4,907,253 A | * | 3/1990 | Watrous ...................... 379/16 |
| 5,361,249 A | * | 11/1994 | Monastra et al. ........... 370/217 |
| 5,715,239 A | * | 2/1998 | Hyodo et al. ................ 370/248 |
| 5,754,527 A | * | 5/1998 | Fujita .......................... 370/217 |
| 6,246,665 B1 | * | 6/2001 | Watanabe et al. ........... 370/218 |
| 6,505,310 B1 | * | 1/2003 | Brown et al. .................. 714/43 |

FOREIGN PATENT DOCUMENTS

| JP | 05-3489 | 1/1993 |
| JP | 07-74747 | 3/1995 |
| JP | 2000-49860 | 2/2000 |

OTHER PUBLICATIONS

Krishna et al.; "On the Speedup Required for Work–Conserving Crosbar Switches"; Jun. 1999; IEEE Journal on Selected Areas in Communications; 1057–1066.*

* cited by examiner

Primary Examiner—Scott Baderman
Assistant Examiner—Joshua Lohn
(74) Attorney, Agent, or Firm—Young & Thompson

(57) ABSTRACT

Each of duplicated incoming line cards, connected to respective input ports of a self-routing switch, receives an incoming packet, determines an output port of the switch based on an address contained in the packet using routing information stored in a routing table, converts the packet into intra-node cells of fixed length and forwards the cells to the switch so that the cells are routed to the output port. Each of duplicated outgoing line cards, connected to output ports of the switch, receives intra-node cells from the switch, converts the cells into a packet, forwards the packet to an outgoing transmission line, and monitors the outgoing transmission line. A fault indication is sent to the incoming line cards if a fault condition is detected in the monitored line. Each incoming line card responds to this indication for updating its table so that traffic is routed to a normally operating outgoing line.

14 Claims, 2 Drawing Sheets

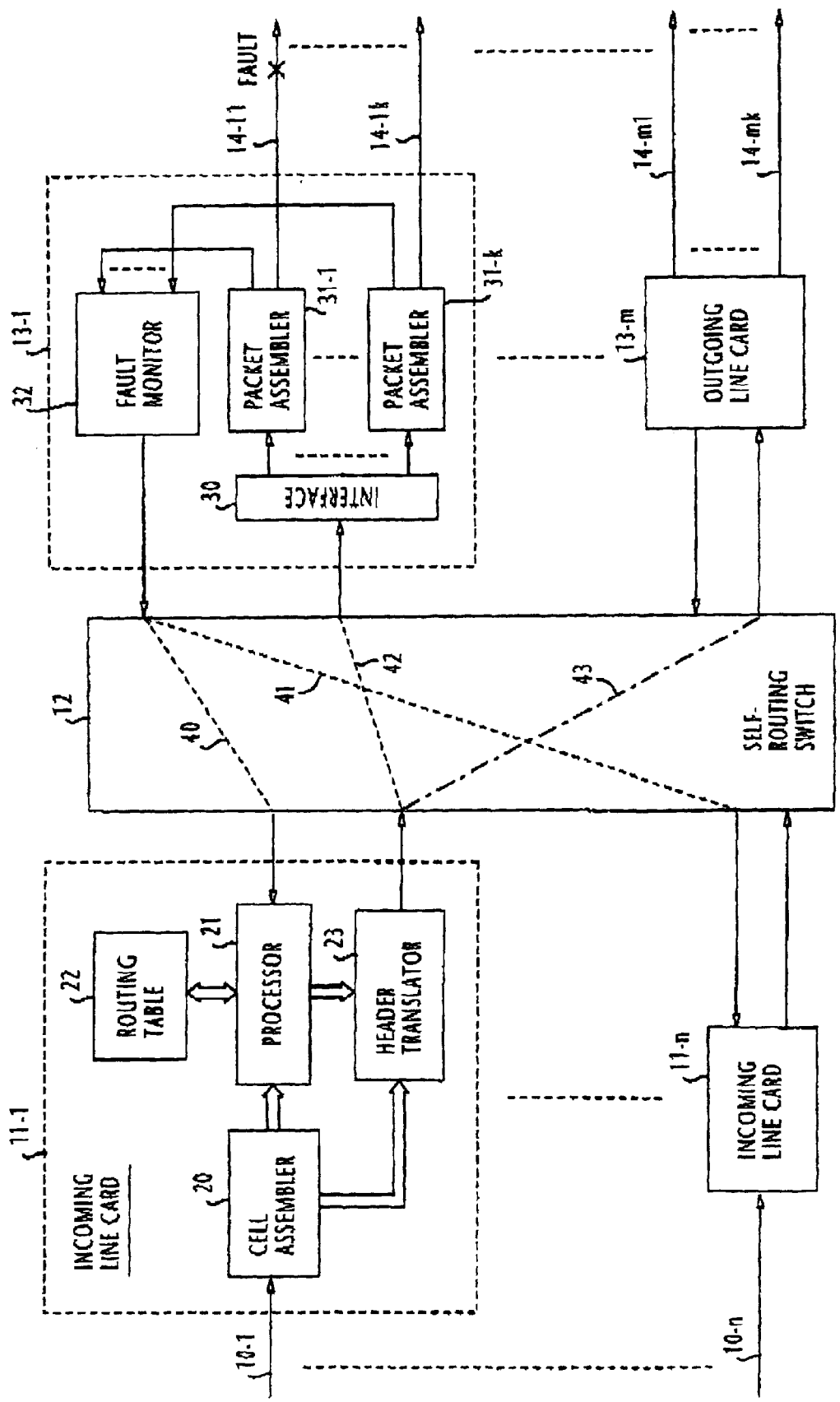

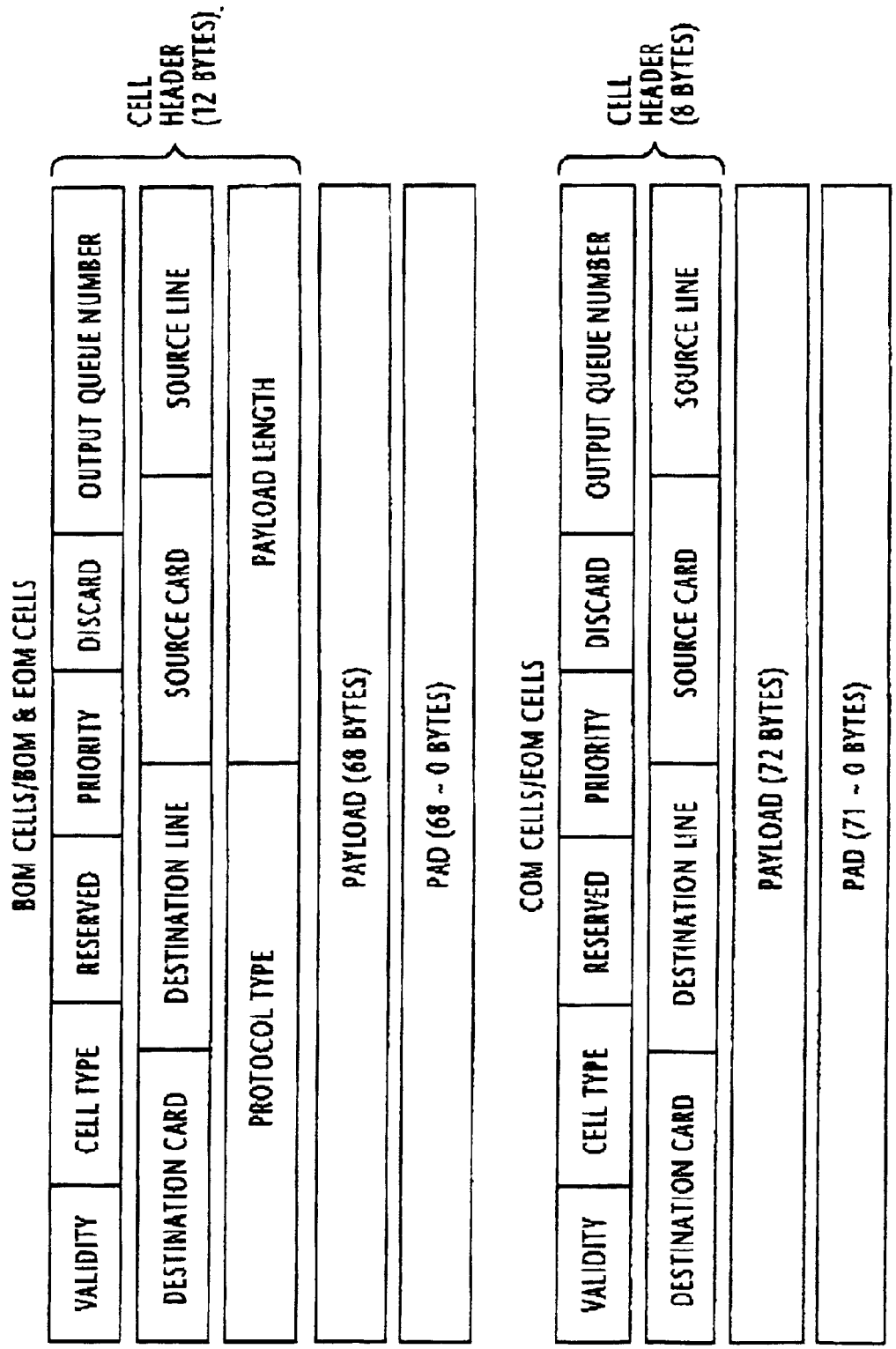

METHOD AND SYSTEM FOR ROUTING PACKETS WITHOUT LOSING PACKETS BY MONITORING OUTGOING LINES

BACKGROUND INVENTION

1. Field of the Invention

The present invention relates generally packet routing systems and more specifically to a method and a system for routing packets without loss of packets when they encounter a fault condition.

2. Description of the Related

In the IP (internet protocol) network, each node of the network includes a router to determine a destination for incoming packets based on routing information stored in a routing table and forwards the packets to the destination, Line cards and associated transmission lines are duplicated to ensure continuity of service against possible faults. Specifically, when a failure is detected in an outgoing transmission line during the time a packet is being routed to that line, the packet is forwarded to the faulty line. The routing table is then updated so that traffic is directed to a duplicated normally operating route. However, during this updating process, packets are still forwarded to the failed route. Because of the delay associated with the table updating process, re-routing cannot be performed instantly when a fault is detected and hence a significant number of packets are lost. In addition, the fault-triggered table updating may represent a substantial amount of burden on the processor, delays are likely to occur in the routinely performed normal task of table updates, which would cause packets to be routed to undesired destinations.

SUMMARY OF THE INVENTION

It is therefore an object of the present invention to provide a method and a system for instantly routing packets without losing packets when they encounter a fault condition.

According to a first aspect of the present invention, there is provided a method of routing traffic from each of a plurality of incoming line cards to one of a plurality of outgoing line cards to which outgoing transmission lines are connected, comprising monitoring the outgoing transmission lines, communicating a fault indication to all of the incoming line cards if a fault condition is detected in at least one of the outgoing transmission lines, and updating a routing table at each of the incoming line cards according to the fault indication so that packets from the incoming line cards are routed to normally operating outgoing transmission lines.

According to a second aspect, the present invention provides a packet routing system comprising a self-routing switch, a plurality of incoming line cards, connected to respective input ports of the self-routing switch, each incoming line card receiving an incoming packet, determining an output port of the self-routing switch based on an address contained in the packet by using routing information stored in a routing table, converting the packet into at least one intra-node cell of fixed data length and forwarding the cell to the switch so that the cell is routed to the output port, and a plurality of outgoing line cards, connected to respective output ports of the self-routing switch, each outgoing line card receiving intra-node cells from the self-routing switch, converting the cells into a packet, forwarding the packet to an outgoing transmission line, monitoring the outgoing transmission line, and transmitting a fault indication to the incoming line cards if a fault condition is detected in the outgoing transmission line. Each of the incoming line cards is responsive to the fault indication for updating the routing table so that traffic from the incoming line cards is routed to a normally operating outgoing transmission line.

BRIEF DESCRIPTION OF THE DRAWINGS

The present invention will be described in detail further with reference to the following drawings, in which:

FIG. 1 is a block diagram of a network node incorporating a packet routing system of the present invention; and FIG. 2 is an illustration of the data format of the intra-node cells employed in the present invention.

DETAILED DESCRIPTION

In FIG. 1, there is shown a packet routing system of a network node according to the present invention. The routing system comprises a plurality of incoming line cards 11-1~11-n respectively connected to incoming transmission lines 10-1~10-n for receiving packets from distant nodes. Incoming line cards 11 are connected to respective input ports of a self-routing switch 12. Self-routing switch 12 is designed to route incoming data units of fixed length to one of its output port according to the individual bits of routing information contained in the incoming data units. A plurality of outgoing line cards 13-1~13-m are connected to respective output ports of the self-routing switch 12. Each outgoing line card 13 is associated with a plurality of outgoing transmission lines 14 for transmitting outgoing packets to the associated lines.

Each incoming line card 11 includes a cell assembler 20 where a received packet is segmented into at least one intra-node cell. Similar to the standardized ATM (asynchronous transfer mode) cell format, the intra-node cell is a data unit of fixed length. Unlike ATM, the intra-node cell has 80 bytes of information including the cell header of 12 or 8 bytes depending on the type of cells as shown in FIG. 2. Packets are segmented into intra-node cells of different types depending on the location of the cells within the original packet such as a BOM cell (beginning of message), an EOM (end of message) cell and one or more COM (continuation of message) cells. The BOM/BOM and EOM cell headers are of 12-byte length containing a validity indication (indicating whether the cell is an idle or traffic cell), the cell type, and other indications including "reserved", "priority", "discard", "output queue length", "destination card", "destination line", "source card", "source line", "protocol type", and "payload length". The intra-node cell of these types has a payload of maximum of 68 bytes and a pad of 68-to 0 bytes depending on the length of the payload. The COM/EOM cell headers are of 8-byte length and the maximum payload length is 72 bytes.

In each incoming line card, a processor 21 is provided in each incoming line card 11 for reading the address of the received packet before the packet is segmented and determines the destination output port by using routing information stored in a routing table 22. The routing information of the intra-node cells assembled by the cell assembler 20 are translated in a header translator 23 according to the destination port determined by the processor 21 so that the translated routing information specifies a destination card which corresponds to the determined destination port and further specifies a destination line corresponding to one of the outgoing transmission lines 14 associated with the specified destination card. Intra-node cells are forwarded from the header translator 23 to the switch 12 via the corresponding input port. The processor 21 of each incoming line card is further connected to an output port of the self-routing switch 12 to receive a fault indication from the outgoing line cards.

Note that the self-routing switch 12 uses only the destination card number contained in the cell for routing it to the outgoing line card 13 that is connected to the determined output port.

Each outgoing line card 13 includes an interface 30 having an input terminal connected to the corresponding output port of the switch 12. Interface 30 has a plurality of output terminals respectively connected to a plurality of packet assemblers 31-1~31-k, which are in turn connected to associated outgoing transmission lines 14. Interface 30 distributes intra-node cells from the switch 12 to one of the packet assemblers 31 according to their routing information that specifies the destination line. Each packet assembler assembles intra-node cells into a packet of the original format by using their cell type information and forwards the packet to the associated outgoing transmission line. Each packet assembler monitors the associated transmission line and informs a line status indication to a fault monitor 32. Fault monitor 32 examines the line status indications from the packet assemblers 31 as well as the operating status of the interface 30 and the packet assemblers 31. If a fault condition occurs in the monitored units, the fault monitor 32 formulates and forwards an intra-cell packet identifying the faulty line or card to all the incoming line cards 11 via the self-routing switch 12.

If a fault occurs in the transmission line 14-11, the fault monitor 32 sends a fault indication cell through the switch 12 on paths 40 and 41 to the processor of all incoming line cards. In each incoming line card, the processor 21 responds to the fault indication cell from the fault monitor 32 for updating the routing table 22 so that traffic from the incoming line card which would otherwise be routed to the faulty destination line 14-11 is routed to a normal destination line 14-1k, for example, via a path 42 of the switch 12. If the outgoing line card 13-1 should fail, traffic from the incoming line card 11-1, for example, will be routed to a normally operating outgoing line card 13-m, for example, via a path 43 of the switch 12.

Since the outgoing lines and cards are constantly monitored and the routing information of the incoming line cards are instantly updated with a fault indication whenever a fault occurs on the monitored lines and cards, traffic from the incoming lines are automatically routed to normally operating outgoing lines. Thus, loss of packets which would otherwise occur when they encounter a fault condition can be avoided.

What is claimed is:

1. A method of routing traffic from each of a plurality of incoming line cards to one of a plurality of outgoing line cards to which outgoing transmission lines are connected, comprising:

monitoring said outgoing transmission lines exclusively;

communicating a fault indication to all of said incoming line cards if a fault condition is detected in at least one of said outgoing transmission lines; and updating a routing table at each of said incoming line cards according to the fault indication so that packets from said incoming line cards are routed to normally operating outgoing transmission lines.

2. The method of claim 1, further comprising:

monitoring said outgoing line cards exclusively;

communicating a fault indication to all of said incoming line cards if a fault condition is detected in at least one of said outgoing line cards; and updating a routing table at each of said incoming line cards according to the fault indication so that packets from said incoming line cards are routed to normally operating outgoing line cards.

3. A method of routing traffic from each of a plurality of incoming line cards to one of a plurality of outgoing line cards to which outgoing transmission lines are connected, comprising:

receiving, at each of said incoming line cards, a packet from one of said incoming transmission lines;

determining an output port of a self-routing switch based on an address contained in the packet by using routing information stored in a routing table;

converting the packet into at least one intra-node cell of fixed data length and forwarding the cell to the switch so that the cell is routed to said output port;

receiving intra-node cells from the self-routing switch, converting the cells into a packet;

forwarding the packet to an outgoing transmission line;

monitoring the outgoing transmission lines exclusively;

communicating a fault indication to the incoming line cards if a fault condition is detected in at least one of said outgoing transmission lines; and updating said routing table at each of said incoming line cards according to said fault indication so that traffic from the incoming line cards is routed to a normally operating outgoing transmission line.

4. The method of claim 3, wherein the communicating step comprises communicating said fault indication via said self-routing switch.

5. The method of claim 3, further comprising:

monitoring said outgoing line cards exclusively;

communicating a fault indication to all of said incoming line cards if a fault condition is detected in at least one of said outgoing line cards; and updating said routing table at each of said incoming line cards according to the fault indication so that packets from said incoming line cards are routed to normally operating outgoing line cards.

6. The method of claim 5, wherein the communicating step comprises communicating said fault indication via said self-routing switch.

7. A packet routing system comprising:

a self-routing switch;

a plurality of incoming line cards, connected to respective input ports of the self-routing switch, each incoming line card receiving an incoming packet, determining an output port of the self-routing switch based on an address contained in the packet by using routing information stored in a routing table, converting the packet into at least one intra-node cell of fixed data length and forwarding the cell to the switch so that the cell is routed to said output port; and a plurality of outgoing line cards, connected to respective output ports of the self-routing switch, each outgoing line card receiving intra-node cells from the self-routing switch, converting the cells into a packet, forwarding the packet to an outgoing transmission line, monitoring the outgoing transmission line, and transmitting a fault indication to the incoming line cards if a fault condition is detected in said outgoing transmission line, each of said incoming line cards being responsive to the fault indication for updating said routing table so that traffic from the incoming line cards is routed to a normally operating outgoing transmission line.

8. The packet routing system of claim 7, wherein each of said outgoing line cards is configured to monitor operating status of the outgoing line card and transmitting a fault indication to the incoming line cards if a fault condition is detected in said outgoing line card, each of said incoming line cards being responsive to the fault indication for updating said routing table so that traffic from the incoming line cards is routed to a normally operating outgoing line card.

9. The packet routing system of claim 8, wherein each of said outgoing line cards is configured to transmit said fault indication of the outgoing line card to the incoming line cards via said self-routing switch.

10. The packet routing system of claim 7, wherein each of said outgoing line cards is configured to transmit said fault indication of the outgoing transmission line to the incoming line cards via said self-routing switch.

11. A packet routing system comprising:

a self-routing switch;

a plurality of incoming line cards, connected to respective input ports of the self-routing switch, each incoming line card receiving an incoming packet, determining an output port of the self-routing switch based on an address contained in the packet by using routing information stored in a routing table, converting the packet into at least one intra-node cell of fixed data length and forwarding the cell to the switch so that the cell is routed to said output port; and a plurality of outgoing line cards, connected to output ports of the self-routing switch, for receiving intra-node cells from the self-routing, each of the outgoing line cards including:

an interface having an input terminal connected to a corresponding one of said output ports of the switch and a plurality of output terminals for distributing the received intra-node cells to one of the output terminals; and a plurality of packet assemblers respectively connected to said output terminals of the interface, each packet assembler receiving the cells from the corresponding output terminal, converting the cells into a packet, and forwarding the packet to an outgoing transmission line, a monitoring circuit for monitoring the outgoing transmission line, and transmitting a fault indication to the incoming line cards if a fault condition is detected in said outgoing transmission line, each of said incoming line cards being responsive to the fault indication for updating said routing table so that traffic from the incoming line cards is routed to a normally operating outgoing transmission line.

12. The packet routing system of claim 11, wherein each of said outgoing line cards is configured to monitor operating status of the outgoing line card and transmitting a fault indication to the incoming line cards if a fault condition is detected in said outgoing line card, each of said incoming line cards being responsive to the fault indication for updating said routing table so that traffic from the incoming line cards is routed to a normally operating outgoing line card.

13. The packet routing system of claim 12, wherein each of said outgoing line cards is configured to transmit said fault indication of the outgoing line card to the incoming line cards via said self-routing switch.

14. The packet routing system of claim 11, wherein each of said outgoing line cards is configured to transmit said fault indication of the outgoing transmission line to the incoming line cards via said self-routing switch.

* * * * *